United States Patent [19]

Moribe et al.

[11] Patent Number: 4,775,825
[45] Date of Patent: Oct. 4, 1988

[54] POSITIONING METHOD AND APPARATUS THEREFOR

[75] Inventors: Yoshihiro Moribe, Chigasaki; Osamu Beppu; Mikio Takahashi, both of Odawara, all of Japan

[73] Assignee: Hitachi, Ltd., Tokyo, Japan

[21] Appl. No.: 64,557

[22] Filed: Jun. 22, 1987

[30] Foreign Application Priority Data

Jun. 25, 1986 [JP] Japan .................................. 61-146868

[51] Int. Cl.⁴ .............................................. H02P 8/00
[52] U.S. Cl. ..................................... 318/696; 318/685
[58] Field of Search ................................ 318/696, 685

[56] References Cited

U.S. PATENT DOCUMENTS 3,586,953 6/1971 Markkanen ........................ 318/685
3,760,252 9/1973 Beery .................................. 318/611
4,496,892 1/1985 Bugatto, Sr. ....................... 318/696

Primary Examiner—William M. Shoop, Jr.
Assistant Examiner—M. Bergmann
Attorney, Agent, or Firm—Antonelli, Terry & Wands

[57] ABSTRACT

A method and apparatus for moving a moving member of a positioning mechanism to a target position by means of a stepper motor as a driver. The method and apparatus alleviate the positioning error attributable to the hysteresis of the stepper motor, which is inherent in stepper motor drive systems, by controlling the oscillation damping condition when the stepper motor has entered a damped oscillation phase in the vicinity to the target positon. The damping condition is controlled by varying the solid friction factor of the mechanism or the drawback torque constant of the stepper motor.

18 Claims, 11 Drawing Sheets

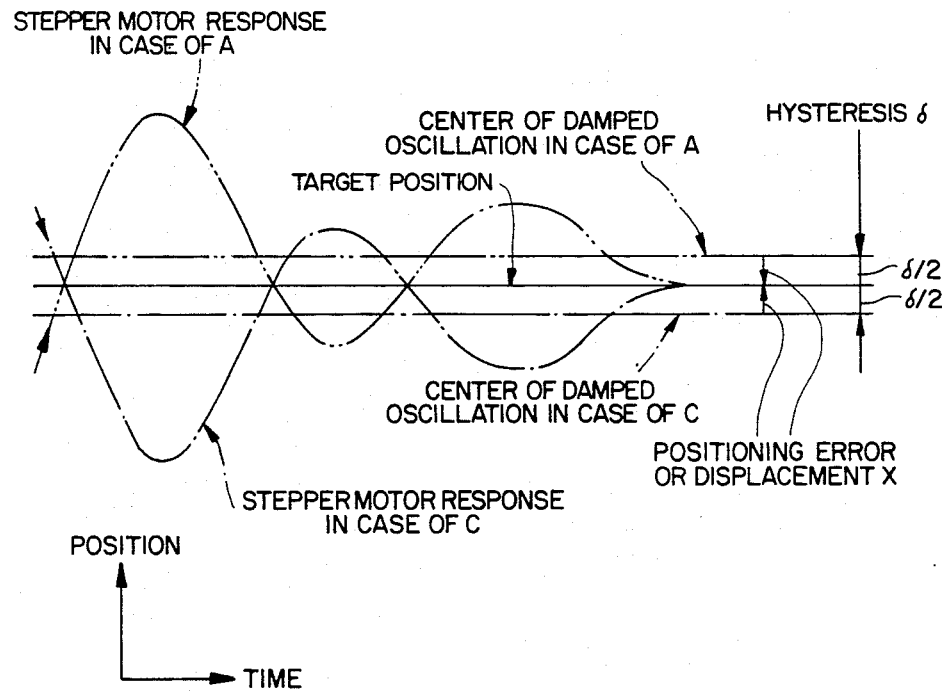

POSITIONING METHOD AND APPARATUS THEREFOR

BACKGROUND OF THE INVENTION

This invention relates to a positioning method and apparatus using a stepper motor for moving an object to a specified position, and particularly to a positioning method and apparatus suitable for a magnetic disc drive unit.

A conventional magnetic disc drive unit based on the stepper motor positioning system has employed a unidirectional excitation system in order to eliminate the hysteresis effect of the stepper motor in coping with an increased track density, as described in U.S. Pat. No. 4,490,662 (corresponding to JP-A-58-29397). For the enhancement of the positioning accuracy of the above system, a method of temporary stoppage before the target position was proposed in U.S. Patent Application Ser. No. 009,072 (corresponding to JP-A-61-84713). These systems are both intricate in their logical operating manners and insufficient in the compensation for a prolonged access time. U.S. Pat. Nos. 4,489,259 and 4,437,049 also disclose stepper motor positioning systems.

The above-mentioned prior art systems do not deal with the reduction of access time of the positioning mechanism.

SUMMARY OF THE INVENTION

An object of this invention is to achieve the reduction of access time and at the same time improve the positioning accuracy.

In order to achieve the above objective, a primary feature of the invention is to control the damping condition of the moving member with damped oscillation at the target position so that it stops at an identical position irrespective of the moving direction.

A secondary feature of the invention is to control the drawback torque coefficient of the stepper motor and/or the solid friction force of the head support system so as to make the identical position, mentioned in the primary feature, coincident with the target position.

DESCRIPTION OF THE PREFERRED EMBODIMENTS

Figure 2A:
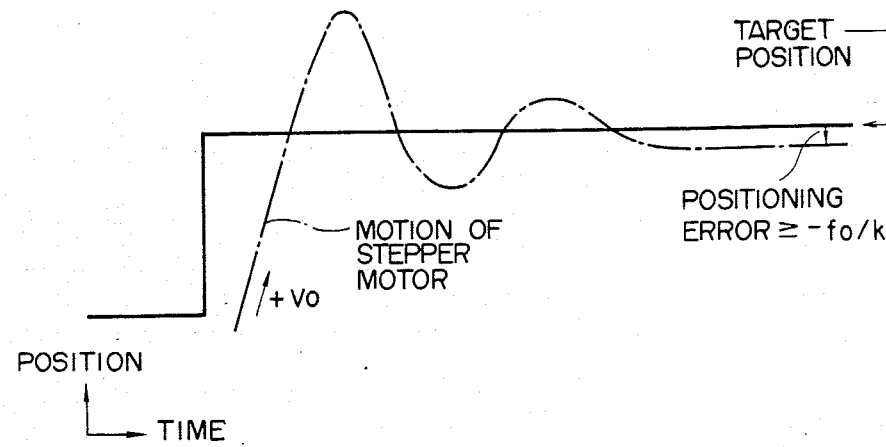
FIGS. 2A and 2B are diagrams used to explain the positioning error depending upon the rotational direction of the stepper motor.
Figure 2B:
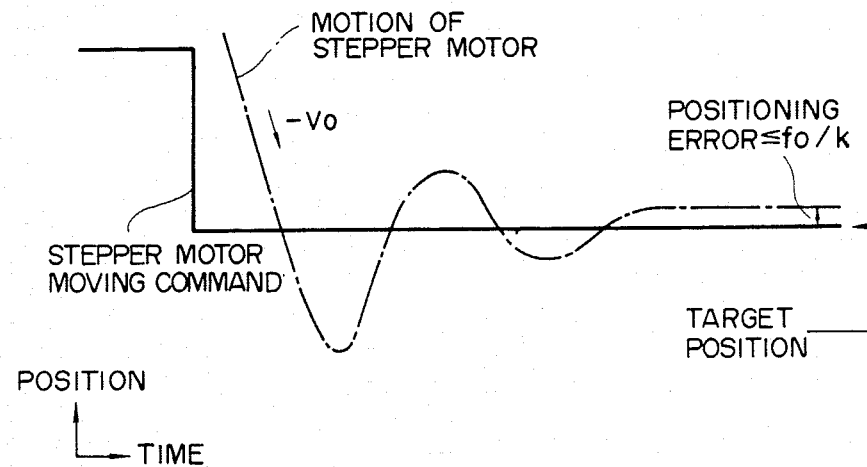

Before entering into the details of embodiments of this invention, the principle of the present invention will be described first. A positioning system in which a moving member is moved to a target position by being driven with a stepper motor involves a positioning error in either direction at the target position depending upon the rotational direction of the stepper motor. The positioning error will be explained with reference to FIGS. 2A and 2B. FIG. 2A shows the stepper motor moving command (drive pulses) and the response of the stepper motor in the positioning operation by turning the stepper motor clockwise, while FIG. 2B shows the event by turning the stepper motor counterclockwise. In the case of FIG. 2A, the motor approaches and overshoots the target position in a positive direction and, after damped oscillation, it comes to a stop with a negative positioning error. In the case of FIG. 2B, the motor overshoots the target position in a negative direction and stops with a positive positioning error, as opposed to the former case.

Figure 6:
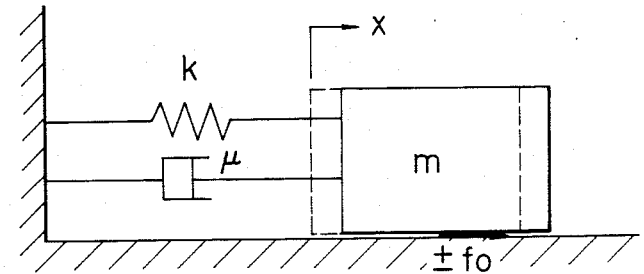
FIG. 6 is a diagram useful for explaining the reason of generation of the positioning error.

The damped oscillatory motion of the stepper motor after it has overshot the target position is analyzed using a model shown in FIG. 6 which is assumed to be a head positioning mechanism for a magnetic disc drive unit. This model is given the equation of motion as follows.

$$m\ddot{x} + \mu \dot{x} + kx - (\dot{x}/|\dot{x}|)f_o = \quad (1)$$

where the solid friction has its polarity determined from the polarity of $\dot{x}$ (direction of motion). In this equation, m represents the mass of the magnetic head, $\mu$ the viscous damping factor attributable to the head support system and the motor winding, k the drawback torque constant of the stepper motor, $f_o$ the solid friction force of the head support system and $\dot{x}$ the displacement of the magnetic head. With an initial condition of $\dot{x}=0$ and $\dot{x}=v_o$ at $t=0$ (i.e., the mass m is initially at $\dot{x}=0$ at $t=0$ with the initial speed of $v_o$) and on condition of $\mu$ (damping factor) $> \sqrt{mk}$, the equation (1) is solved for the displacement x at $\dot{x}=0$ (stoppage):

$$-F_o/k \leq x \leq +f_o/k$$

Namely, the stop position is within a range of $\pm f_o/k$. Accordingly, the stepper motor positioning system can have a maximum positioning error of $+f_o/k$ or $-f_o/k$ depending on the rotational direction of the motor, as shown in FIGS. 2A and 2B. Obviously, an exact stop position is obtained by solving equation (1) and calculating the solution using specific numerical values of m, $\mu$, k and $f_o$, as well as using initial values of x, x, and x.

The positive or negative offset of the stepper motor stop position is attributable to the fact that the damping condition is equal in both rotational directions after the stepper motor has overshot the target position, as will be appreciated from FIGS. 2A and 2B.

Figure 2C:
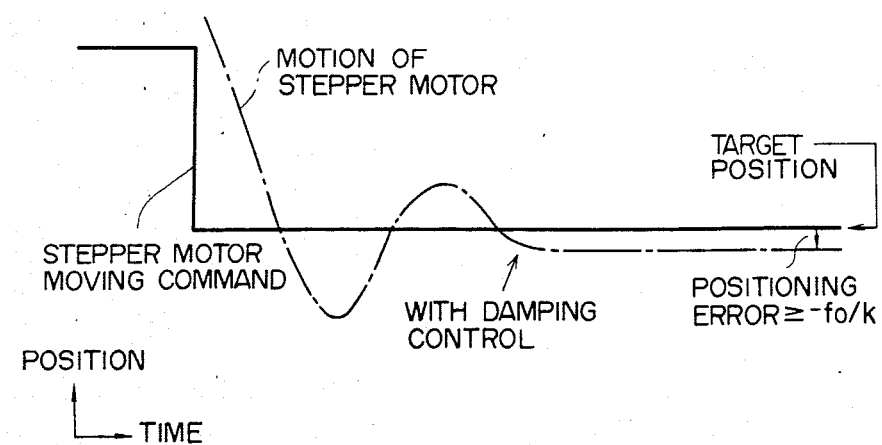
FIG. 2C is a diagram used to explain the inventive stepper motor positioning method.

The inventors of this invention have contemplated making the stepper motor to have identical quiescent positions irrespective of the rotational direction by controlling the oscillation damping condition as shown in FIG. 2C. The damping condition is controlled by a method of variable pulse application to the stepper motor immediately before it overshoots or approaches the target position, or by a mechanical method.

Although the present invention enables a stepper motor to stop at an identical position irrespective of the rotational direction, it still involves a positioning error at a target position as shown in FIGS. 2A and 2C. In the case of a fixed (hard) magnetic disc drive unit, if it has the reproducibility for the head stop position, the positioning error is not so significant in a practical sense because data recording and retrieving are performed for the same disc drive unit and when retrieving data, the head only needs to be positioned to where the data was recorded. However, in another case such as a floppy disk drive unit which retrieves data from a disc recorded by another magnetic disc drive unit, it is desirable that the disc drive unit does not have a positioning error.

The inventors of this invention have reached a conception of bringing the stepper motor to a stop at the target position, with its positioning error (i.e., displacement x at x=0) being coincident with the center one half the amount of hysteresis of the motor through the control for the oscillation damping condition. Specifically, the solid friction $f_o$ and/or the drawback torque constant k is adjusted so that $f_o/k$ are coincident with the center of the hysteresis.

Embodiments of this invention will now be described in detail.

First Embodiment

Figure 3:
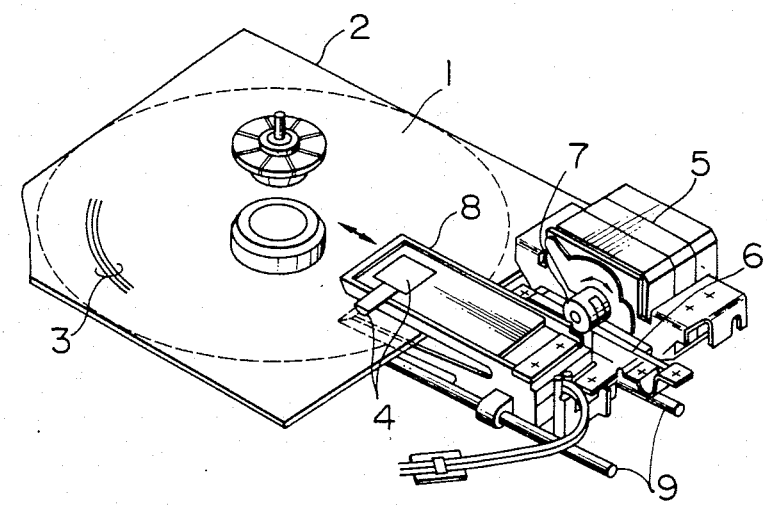
FIG. 3 is a perspective view showing the principal portion of the flexible disc drive unit to which the present invention is applied.

In FIG. 3 showing the first embodiment of this invention, a flexible disc drive unit system to which the invention is applied consists primarily of a rotary disc 1 enclosed in a jacket 2, a magnetic head 4 for recording and retrieving information on concentric recording tracks on the surface of the disc 1, a stepper motor 5 for positioning the magnetic head 4 to a recording track 3, a belt 6 for converting the rotational movement of the stepper motor 5 to the linear movement of the magnetic head 4, a pulley 7 on which the belt 6 is wound in a shape of $\alpha$, and a carriage 8 supported by guide rails 9 for mounting the magnetic head 4. In the above mechanical arrangement, the stepper motor 5 has its rotational motion converted into the linear motion of the magnetic head 4 for the positioning operation.

Figure 1A:
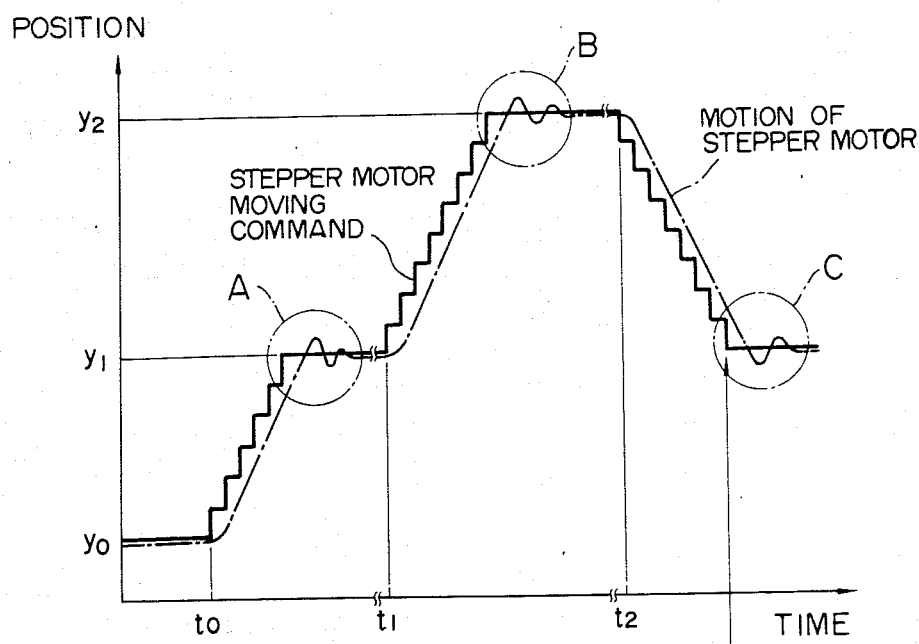
FIG. 1A is a diagram used to explain an example of stepper motor control according to this invention.
Figure 1B:
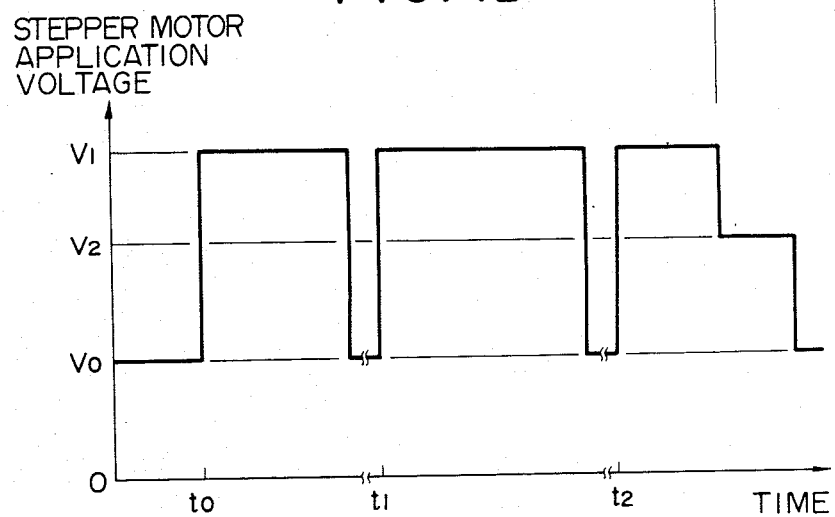
FIG. 1B is a diagram showing the waveform of application voltage pulses for accomplishing the stepper motor control shown in FIG. 1A.

FIGS. 1A, 1B show along the time axis the stepper motor moving commands which operate on the stepper motor 5 to rotate to move the magnetic head 4 in response to pulses supplied to the stepper motor drive circuit, and also shows the resulting response of the stepper motor 5. FIG. 1A is the case of operation in which the magnetic head located in position $y_0$ at time $t_0$ is moved to position $y_1$ by six moving commands, then moved to position $y_2$ at time $t_1$ by eight moving commands, and finally at time $t_2$ moved back to position $y_1$ by eight moving commands in the reverse direction.

The head positioning operations at positions $y_1$, $y_2$ and again $y_1$ are shown in more detail in FIGS. 2A and 2C. FIG. 2A shows portions A and B in FIG. 1A, while FIG. 2C shows portion C in FIG. 1A. In FIG. 2A, the stepper motor follows the moving command with a response of damped oscillation, with its second peak (v=0) being $x \leq \pm f_o/k$, and it settles or stops movement with an error of about not greater than $-f_o/k$ with respect to the target position. When the magnetic head is moved back to position $y_1$ afterward, the application voltage to the stepper motor is switched from $V_1$ to $V_2$ as shown in FIG. 1B so that the stepper motor has its damped oscillation varied to have the same final target approach direction as in the case of FIG. 2A, whereby the motor settles or stops movement with the same error of not greater than $-f_o/k$.

Figure 7:
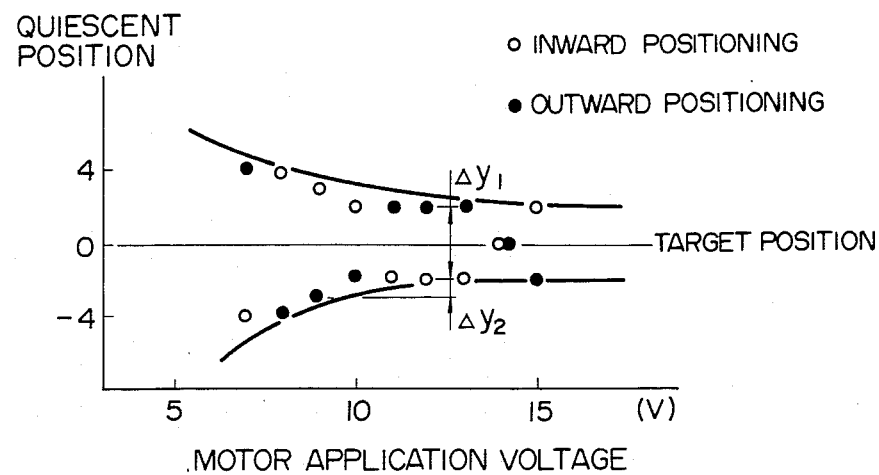
FIG. 7 is a graph showing an experimental result of the positioning error due to the hysteresis for various stepper motor application voltage.

FIG. 7 shows the measurement result of the magnetic head quiescent position which depends on the stepper motor application voltage. When the magnetic head is positioned inwardly (upward direction in FIG. 1A) with an application voltage of 12 volts, the quiescent position has an error of 2 $\mu$m in negative (outward) direction with respect to the target position, and accordingly positioning to a target position in both directions creates a differential error $\Delta y_1$ of 4 $\mu$m. Since the value of k (drawback force of stepper motor) in the equation of motion varies depending on the application voltage, the moving direction immediately before the quiescent state varies at application voltages around 7, 10 and 14 volts as exhibited in FIG. 7. Therefore, application of 12 volts for inward positioning and 9 volts for outward positioning results invariably in an outward error of 1 $\mu$m ($\Delta y_2$) with respect to the target position. Namely, by setting the voltages $V_1$ and $V_2$ in FIG. 1B as mentioned above, the positioning error is rendered negligible.

Figure 4:
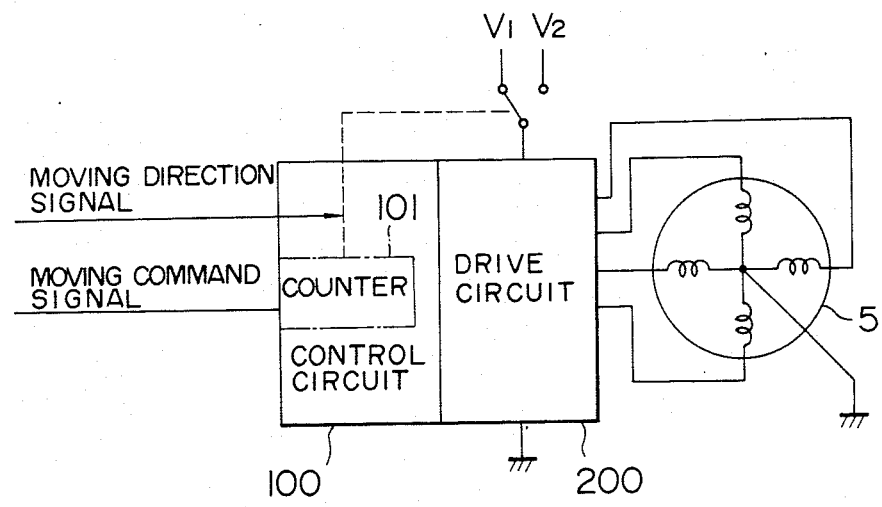
FIG. 4 is a schematic diagram of the control circuit for the disc drive unit shown in FIG. 3.
Figure 5:
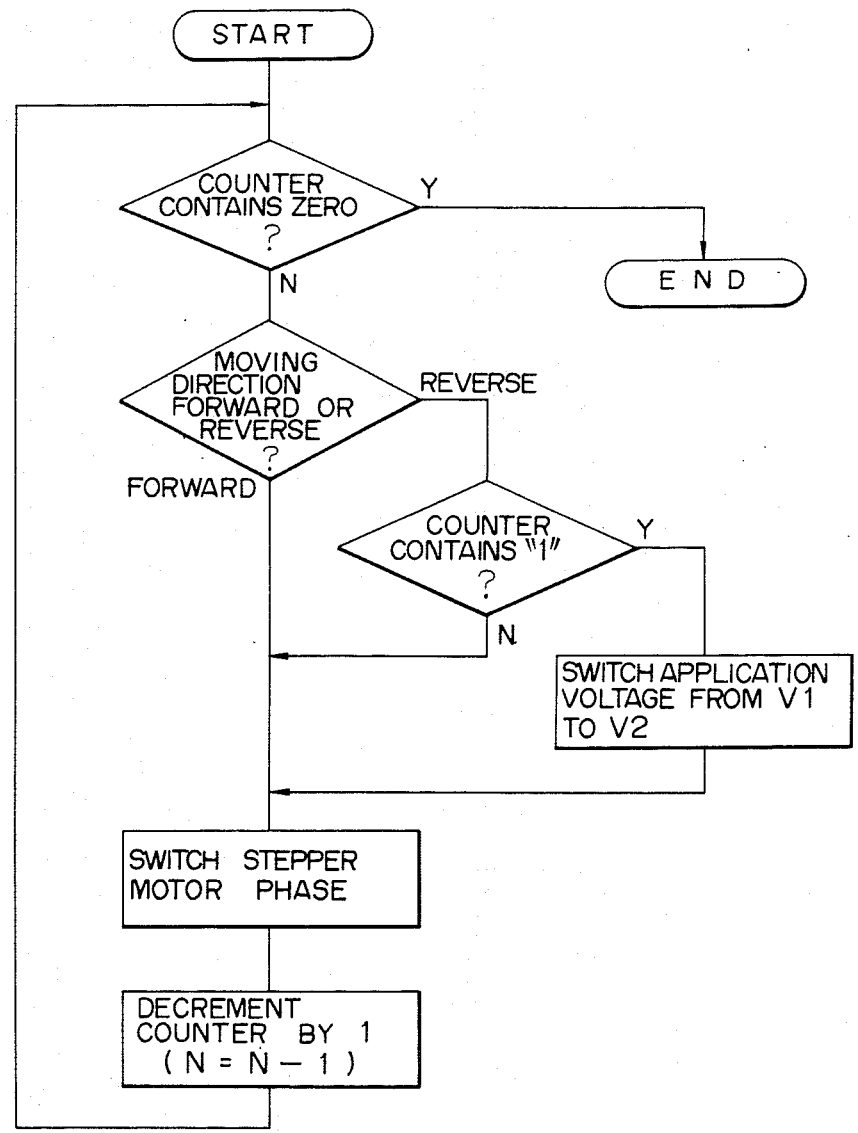
FIG. 5 is a flowchart used to explain the inventive stepper motor control method.

The foregoing positioning system is realized by the circuit arrangement shown in FIG. 4 and the control operation shown in the flowchart of FIG. 5. The control circuit 100 in FIG. 4 receives a moving command signal which represents the number of steps of rotation, and switches the stepper motor application voltage to the drive circuit 200 from $V_1$ to $V_2$ for the final excitation phase when the contents of the counter 101 have decreased to one and the movement of the head is in the reverse direction, as shown in FIG. 5.

Although in the above embodiment, in order to improve the positioning accuracy, the stepper motor application voltage is lowered below the steady-state operation voltage immediately before the target position so that the moving direction immediately before the target is always the same, alternative methods include the raising of the stepper motor application voltage, the changing of application voltage pulse width, and the changing of mechanical parameter $f_o$, $\mu$ or k shown in FIG. 6.

Figure 8:
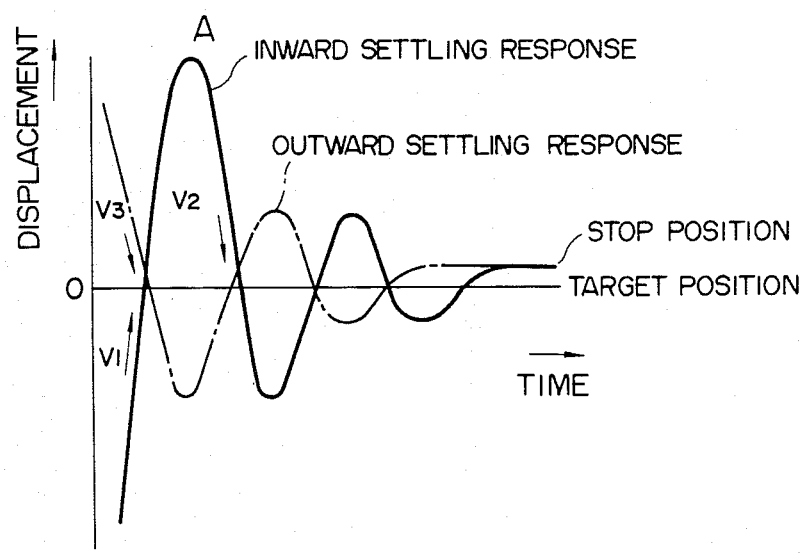
FIGS. 8, 9, 10A and 10B are diagrams showing other examples of stepper motor control according to this invention.
Figure 9:
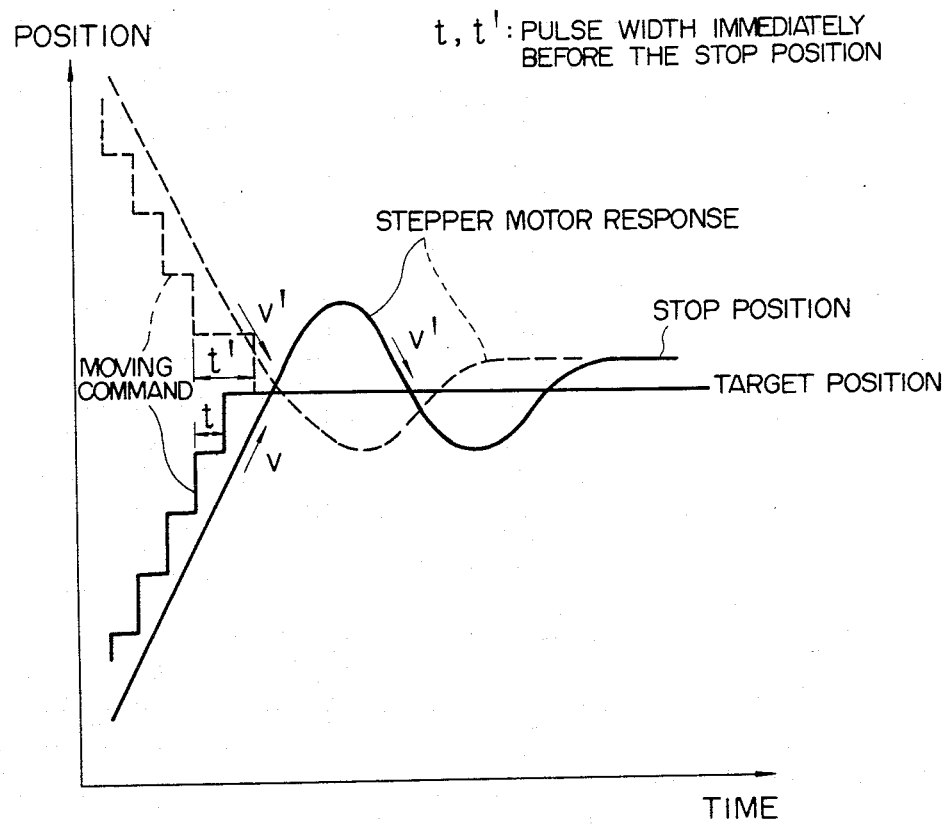
Figure 10A:
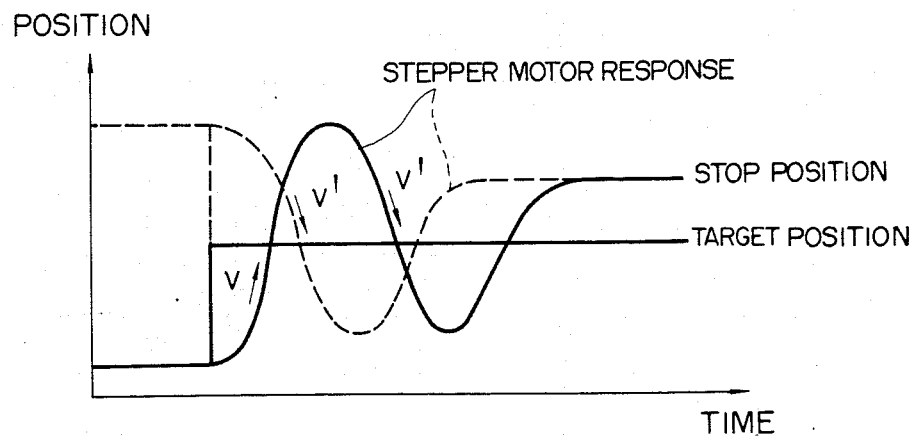
Figure 10B:
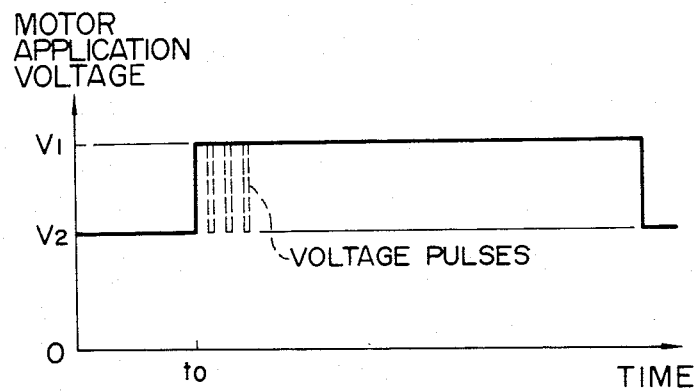

FIG. 8 shows another method, in which for inward positioning of the magnetic head, it approaches the target position at a speed of $v_1$, then swings back outwardly at $v_2$ after passing a point A where x=0, and finally comes to a stop after damped oscillation. For outward positioning, the overshooting speed $v_3$ is set virtually equal to $v_2$, and the magnetic head will stop after the similar damped oscillation. Accordingly, the quiescent position is identical in both approach directions. The approaching speed can readily be controlled by varying the pulse interval before the settling command to the target position (e.g., the final pulse interval t is set to t') as shown in FIG. 9, or by lowering the overshooting speed by application of pulsative voltages to the stepper motor for the settling command to the target position after the motor has been stopped temporarily one step before the target position as shown in FIGS. 10A and 10B.

Second Embodiment

As described previously, the principle of this embodiment is to make the positioning error (i.e., displacement x at x=0) coincident with the center of hysteresis by controlling the oscillation damping condition of the motion of the stepping motor (that is, the head), thereby causing the motor to stop at the target position. The second embodiment of this invention, as will be described in the following, has the same positioning mechanism as the preceding embodiment, and it will not be repeated here. The following describes the step motion of the stepper motor according to this embodiment.

Figure 11A:
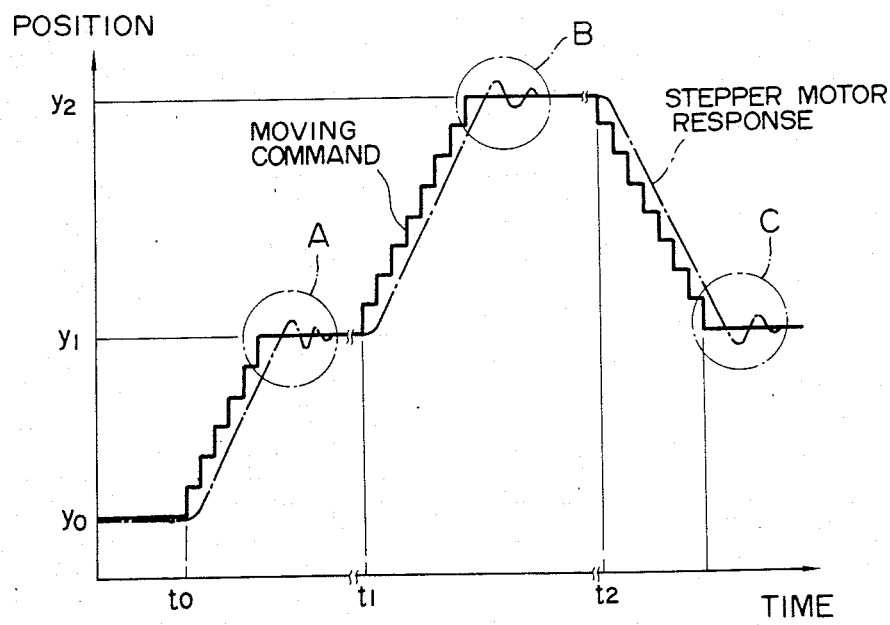
FIG. 11A is a diagram of stepper motor control used to explain the secondary feature of this invention.

FIG. 11A shows along the time axis the stepper motor moving command for turning the stepper motor 5 to move the magnetic head 4, in response to pulses applied to the stepper motor drive circuit, and also shows the resulting response of the stepper motor. FIG. 11B shows in detail the portions A and C of FIG. 11A. This embodiment is intended to stop the magnetic head after oscillation exactly on the target position by controlling the $f_o$ in equation (1). Specifically, $f_o$ is set so that the positioning error is equal to half the hysteresis $\delta$ of the stepper motor, as shown in FIG. 11B. The hysteresis of the stepper motor is defined as a distance between two centers of the oscillatory motions; one center having a center about which the magnetic head approaching the target position in one direction oscillates when it is to stop at the target position and the other center being a center about which the magnetic head approaching the target position in the other direction oscillates when it is to stop at the target position.

Figure 11C:
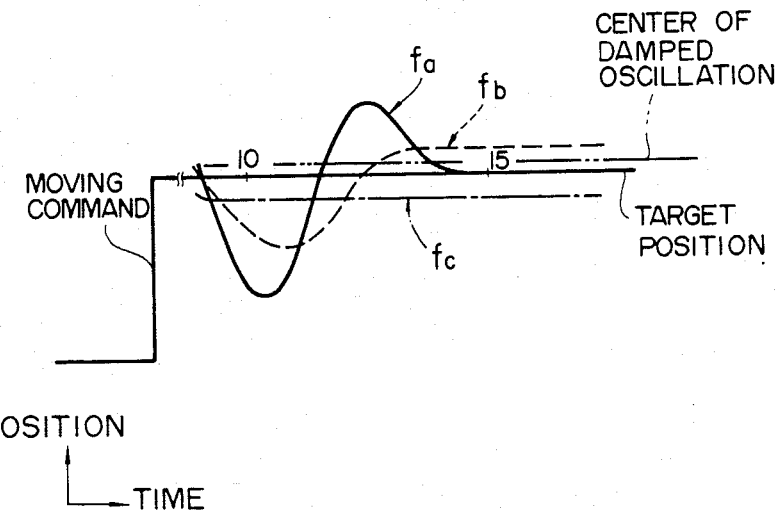
FIG. 11B is an enlarged diagram for the portions in FIG. 11A, FIGS. 11A, 11B and 11C are diagrams for explaining features of this invention.
Figure 12A:
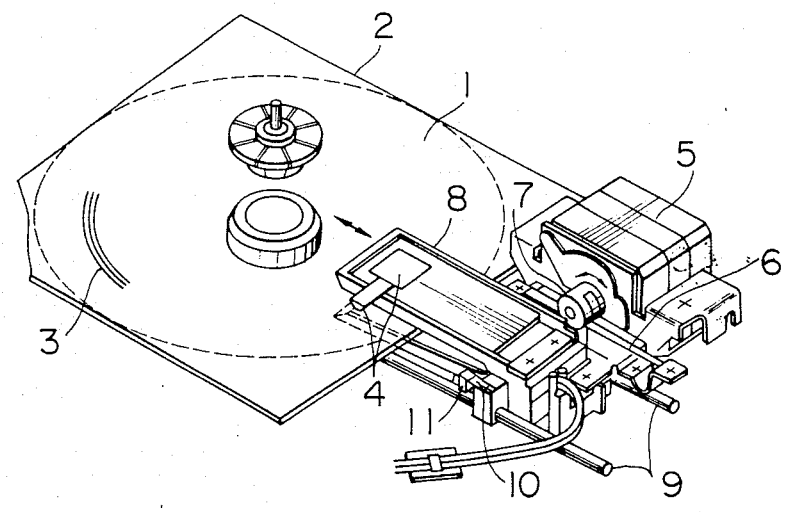
FIGS. 12A, 12B and 12C are diagrams used to explain the flexible disc drive unit based on the stepper motor control shown in FIG. 11A.
Figure 12C:
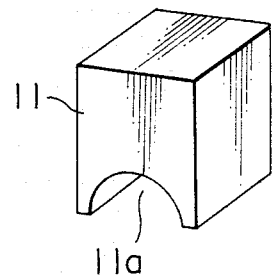
Figure 12B:
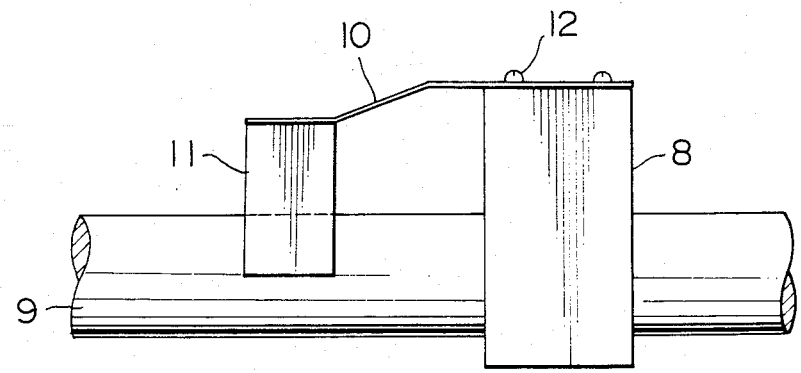

FIGS. 12A, 12B and 12C show means for making the positioning error equal to half the hysteresis. FIG. 12A shows the flexible disc drive unit, which differs from that shown in FIG. 3 in that the carriage 8 presses a friction piece 11, which is supported through a spring 10, onto the guide rail 9 so as to set the solid friction force $f_o$. As shown in detail in FIGS. 12B and 12C, the friction piece 11 having a semicircular recess 11a at its bottom is affixed on one end of the carriage 8 using screws 12 so that it is pressed to the guide rail 9 by the force of the spring 10. The friction piece 11 slides on the guide rail 9 while being pressed at its recess 11a, causing the solid friction force $f_o$ to vary, and the positioning error can be controlled. Shown by $f_a$ $f_b$ and $f_c$ in FIG. 11C are three cases of stepper motor motion with varied solid friction force $f_o$, and the stepper motor stop position can be set theoretically and arbitrarily by varying the solid friction force $f_o$ according to this embodiment, as will be appreciated from the figure.

Although in the above embodiment the dynamic friction force of the magnetic head support system is varied to set $f_o$ so that $\delta/2$=positioning error, this setting can also be accomplished by varying the drawback torque constant k of the stepper motor, namely, by varying the application voltage to the stepper motor.

Although the foregoing embodiments are the positioning of a magnetic head using a stepper motor, the same method can be applied to other positioning systems, e.g., positioning of a work or tool in industrial robots or machine tools, where their positioning error dependence on the moving direction is a problem.

According to this invention, a moving member driven by a stepper motor has its stop position rendered invariable irrespective of the rotational direction of the stepper motor, whereby the positioning accuracy can be improved.

We claim:

1. A positioning method for moving a moving member of positioning mechanism driven by a stepper motor, which rotates in response to step pulses, in a first direction or second direction opposite to the first direction toward a target position and positioning said moving member with damped oscillatory motion to the target position, said method comprising at least one of a first step and a second step;

the first step including moving said moving member by said stepper motor in the first direction to said target position, said moving member moving with the damped oscillatory motion about the target position upon reaching said target position;

the second step including moving said moving member by said stepper motor in the second direction to said target position, said moving member moving with the damped oscillatory motion about the target position upon reaching said target position; and a third step of controlling an oscillatory damping condition of said first step and/or second step so that said first and second steps cause said moving member to stop at a same position near said target position.

2. A positioning method according to claim 1, wherein said third step implements the control of oscillation damping condition by varying one of an amplitude and width of a step pulse applied to said stepper motor immediately before said moving member is moved to said target position.

3. A positioning method according to claim 2, wherein said third step includes a step of varying an amplitude of said step pulse applied to said stepper motor before said moving member is moved to said target position.

4. A positioning method according to claim 2, wherein said third step includes a step of varying a width of said step pulse applied to said stepper motor before said moving member is moved to said target position.

5. A positioning method according to claim 1, wherein said third step implements the control of oscillation damping condition by varying the solid friction force $f_o$ of said positioning mechanism and/or the drawback force of said stepper motor.

6. A positioning method according to claim 1, wherein said third step includes a fourth step of controlling said oscillation damping condition so that said moving member in said first and second directions stops moving at positions spaced from respective centers of said oscillatory motions by one half of a hysteresis of said stepper motor, thereby making said positions identical to said target position.

7. A positioning method according to claim 6, wherein said fourth step includes varying a solid friction force of said positioning mechanism and/or a drawback force of said stepper motor.

8. A positioning method according to claim 6, wherein said moving member comprises a magnetic head and said target position is a recording track of a magnetic disc on which data is recorded or retrieved by said magnetic head.

9. A positioning apparatus for moving a moving member of a positioning mechanism driven by a stepper motor in a first direction or second direction opposite to the first direction toward a target position and positioning said moving member to the target position, said apparatus comprising:
  a drive circuit for rotating said stepper motor in the first or second direction by application of step pulses to said stepper motor; and
  control means for controlling said drive circuit, including control circuit means causing said moving member to approach the target position in the first or second direction and to damp an oscillatory motion of said moving member which motion takes place about the target position upon reaching said target position, and for damping condition means for controlling an oscillation damping condition so that said moving member approaching the target position in any of the first and second direction stops at a same position near said target position.

10. A positioning apparatus according to claim 9, wherein said damping condition means controls the oscillation damping condition so that said moving member in said first and second directions stops moving at positions spaced from respective centers of said oscillatory motions by a distance corresponding to one half of a hysteresis of said stepper motor, thereby positioning said moving member approaching said target position in either direction at said target position.

11. A positioning apparatus according to claim 9, wherein said damping condition means includes velocity means for controlling the velocity of said moving member so that said moving member approaching said target position in one of said first and second directions and oscillating about said target position with said damped oscillation crosses said target position in a direction and at a velocity identical to a direction and a velocity, respectively, of said moving member at a moment at which said member approaching in the other direction crosses said target position, thereby stopping said member approaching said target position in either direction at said same position.

12. A positioning apparatus according to claim 9, wherein said damping condition means implements the control of oscillation damping condition for said moving member by varying one of an amplitude and width of a step pulse applied to said stepper motor immediately before said moving member is moved to the target position.

13. A positioning apparatus according to claim 12, wherein said damping condition means varies an amplitude of said step pulse.

14. A positioning apparatus according to claim 12, wherein said damping condition means varies a width of said step pulse.

15. A positioning apparatus according to claim 9, wherein said damping condition means includes means for adjusting a solid friction force of said positioning mechanism.

16. A positioning apparatus according to claim 9, wherein said damping condition means includes means for adjusting a drawback force of said stepper motor.

17. A positioning apparatus for moving a moving member of a positioning mechanism driven by a stepper motor in a first direction or second direction opposite to the first direction toward a target position and positioning said moving member to the target position, said apparatus comprising:
  drive circuit means for rotating said stepper motor in the first or second direction by application of step pulses to a stepper motor;
  converting means for converting rotational motion of said stepper motor to linear motion so as to move said moving member; and
  friction factor adjusting means coupled to said converting means for varying a solid friction factor of said converting means in moving said moving member so that said moving member stops at said target position.

18. A positioning apparatus according to claim 11, wherein said moving member comprises a magnetic head and said target position is a recording track of a magnetic disc on which data is recorded or retrieved by said magnetic head.

* * * * *